Sept. 9, 1969  F. E. WINTER ET AL  3,465,469
LIQUID VAPORIZER
Filed Aug. 5, 1964  2 Sheets-Sheet 1
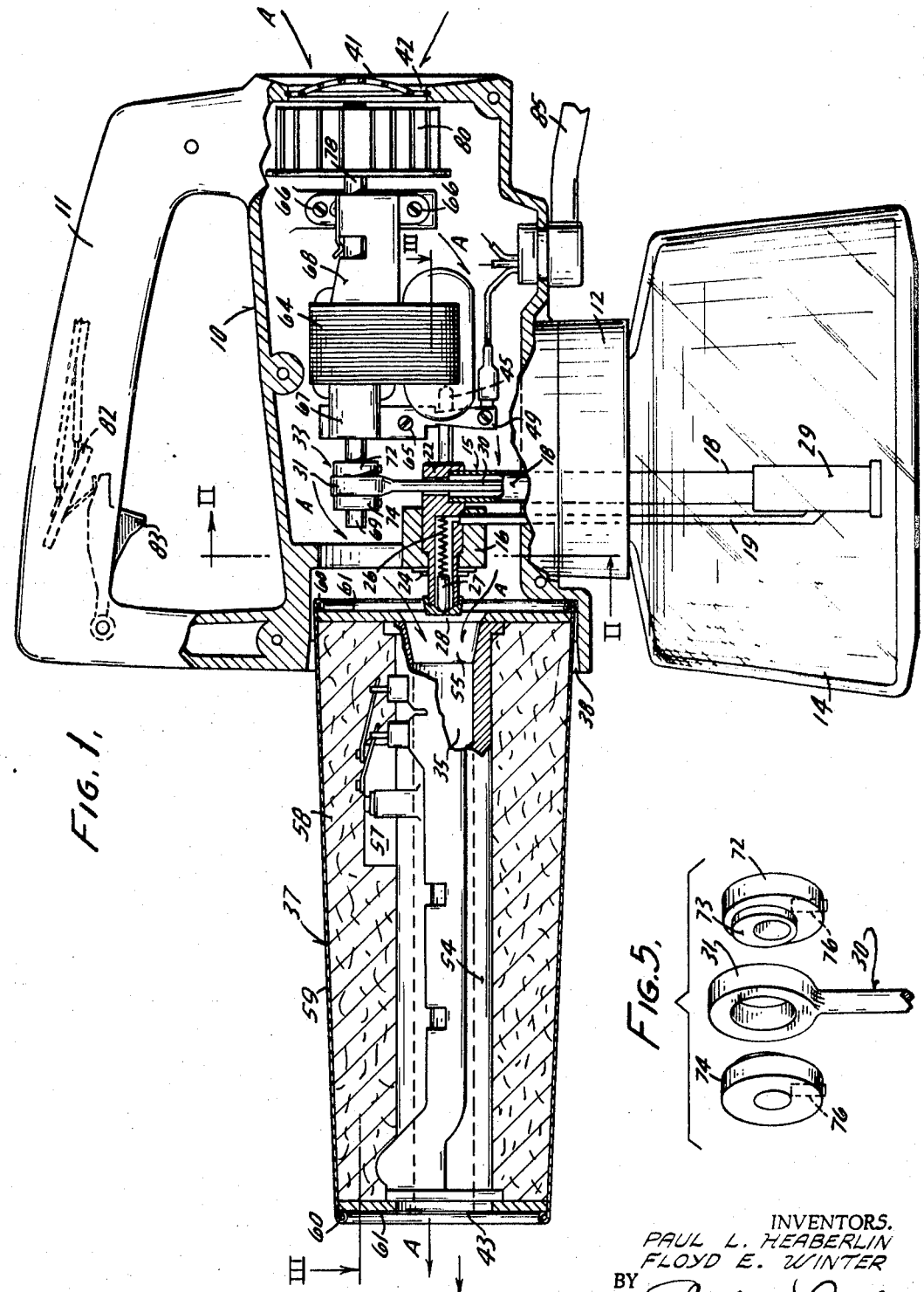
INVENTORS.
PAUL L. HEABERLIN
FLOYD E. WINTER
BY
ATTORNEY.

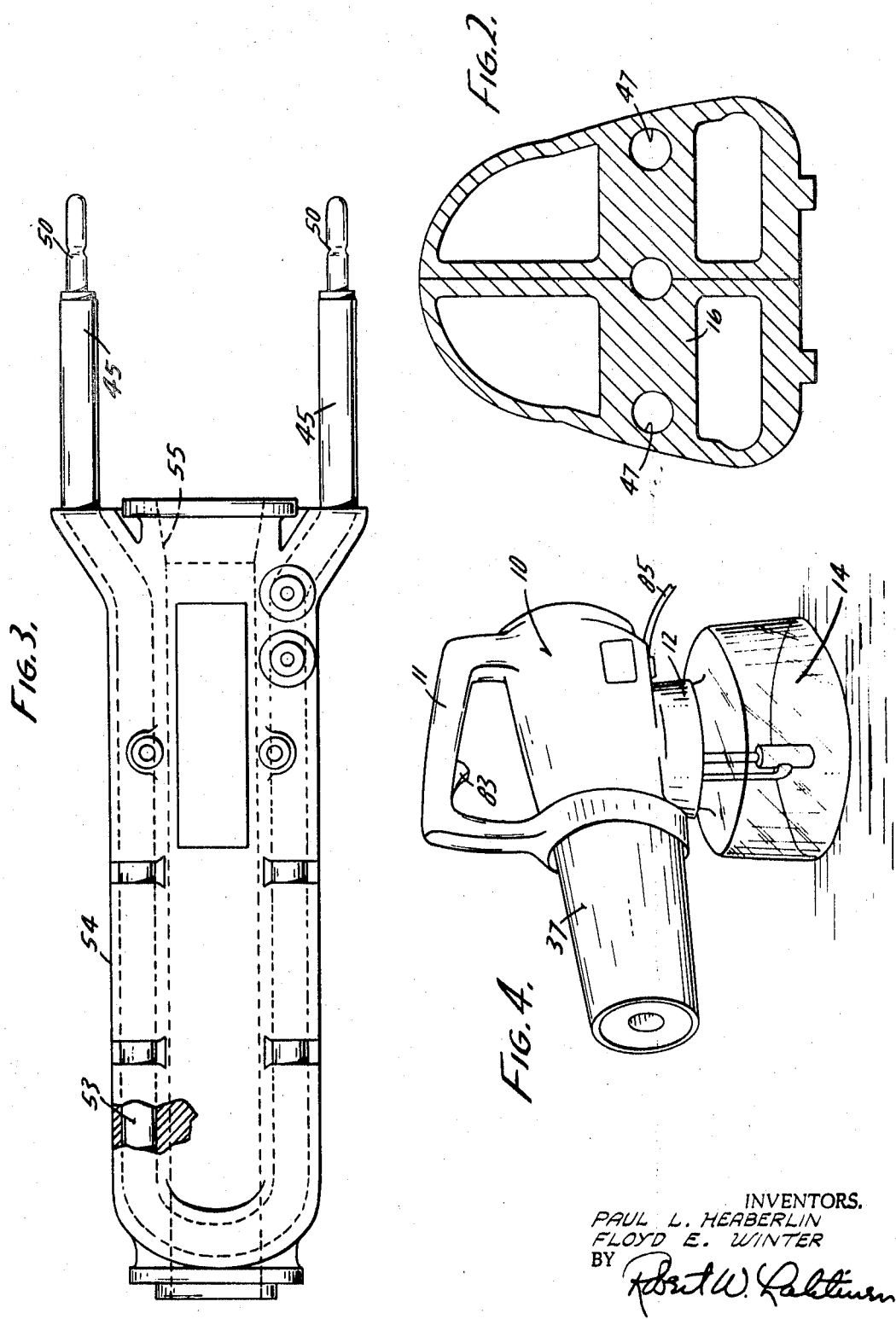

United States Patent Office 3,465,469
Patented Sept. 9, 1969

3,465,469
LIQUID VAPORIZER
Floyd E. Winter and Paul L. Heaberlin, Kirksville, Mo., assignors to McGraw-Edison Company, Milwaukee, Wis., a corporation of Delaware
Filed Aug. 5, 1964, Ser. No. 387,729
Int. Cl. A01m *19/00*
U.S. Cl. 43—129                     2 Claims This invention relates to a portable, compact liquid vaporizer particularly adapted to the vaporization of liquid insecticide in a stream of air to form an insect exterminating and repelling insecticide fog.

The applicants have provided a compact portable insecticide fogging device using a rotary motor to drive both a liquid spray unit and an air delivering blower. Use of a single driving motor affords a positive balance between air, and insecticide with the air being delivered to the mixing-vaporizing chamber solely through the action of the blower forcing the air through a closed passageway and liquid insecticide particles being delivered by a pump-spray unit driven by the common motor. Accordingly the delivery rates can be predetermined and adjustment by the operator eliminated to assure favorable conditions of operation.

The blower delivers air through the housing to provide cooling for the motor and a turbulent flow of air to the mixing-vaporizing chamber for admixture with the spray of liquid particles.

It is an object of this invention to provide a compact, portable insect fogging device which delivers air and liquid spray under pressure to a heated mixing vaporizing zone for further breakdown of the liquid particles which are issued from the device as a continuous fog of minute airborne liquid insecticide particles.

It is a further object of this invention to provide an insecticide fogging apparatus that has a predetermined balance between the quantities of air and insecticide to avoid the necessity for operator adjustment.

It is also an object of this invention to control the delivery of air and spray particles to a heating zone by using a common motor to drive both a pump-spray mechanism and a blower.

These and other objects and advantages of this invention will become apparent from the following description when taken in connection with the accompanying drawings wherein:

FIGURE 1 is a side elevation of the vaporizer of this invention, partly broken away and partly in section;

FIGURE 2 is a partial section view taken along line II—II of FIGURE 1;

FIGURE 3 is a plan view of the heating chamber element with the housing and insulation removed, with the element partially broken way a partly in phantom view;

FIG. 4 is a perspective view of the insecticide fogger of this invention; and

FIGURE 5 is an exploded view of the upper portion of the plunger and the eccentric.

Referring to FIGURES 1 and 4 of the drawings, a housing 10 is provided with a handle 11 formed as an integral part thereof. Secured to and depending from a lower portion of the housing 10 is a collar 12 which receives the threaded neck of jar or reservoir 14. A pump and spray unit 15 is carried by the housing, being supported by a housing web portion 16 and contact with the lower wall of the housing through which extend the plunger tube 18 and feed line 19. A spray pin spring 26 urges the nylon spray pin 27 toward the nozzle 28 which is carried by the forward threaded end portion of the spray body 22. Feed line 19 and plunger tube 18 depend from the spray body and connect at their lower ends to the cylinder 29. A nylon plunger 30 extends downwardly through the plunger tube 18 to the cylinder 29 with a loop 31 at its upper end that is journaled about the offset portion of the eccentric 33. The pump and spray unit 15 actuated by reciprocation of plunger 30, delivers a stream of liquid under pressure to the nozzle 28 which is emitted as an expanding cone of liquid particles into the turbulent flow of air entering the heating zone 35 from the housing.

At the forward end of the housing 10 is a tubular heating unit 37 with one end disposed in a generally cylindrical recess 38 of the housing. A minimal clearance exists between the maximum diameter peripheral surface of heating unit 37 and the cylindrical housing recess 38. This annular clearance may be closed by a seal or gasket, but this has not been necessary in practice. The heating unit 37 and housing 10 cooperate to form a continuous passageway having an air intake opening 42 covered by a grill 41 and a discharge opening 43 at the distal end of heating unit 37. The heating unit is releasably secured in the housing recess 38 by a pair of bayonet type terminal elements 45 (FIG. 3) that extend through the cylindrical apertures 47 in the housing web portion 16 (FIG. 2) and are releasably retained by a pair of resilient terminal clips 49 mounted on the housing which engage the detent grooves 50 (FIG. 3) of the bayonet terminals 45 in the assembled condition. Electrical terminal clips 49 are also the electrical contacts supplying current to the heating element 53. The generally U-shaped sheathed heating element 53 is imbedded in a cast member 54, having a generally cylindrical passageway extending therethrough to define the heating zone 35. To reduce the restriction at the entrance to the heating zone a frusto-conical portion 55 is provided. The sheathed heating element 53 is interrupted and placed electrically in series with a thermostat 57 which senses the temperature of the upper surface of cast member 54 and functions to maintain a predetermined temperature within the heating zone. The cast member 54 and thermostat 57 are surrounded by insulation 58 and enclosed within the frusto-conical cover 59 which has rolled edges 60 at each end that secure endplates 61 to complete the heating unit assembly.

A double shafted motor 64 is secured to the right half of the housing 10, which is shown in the sectioned portion of FIGURE 1, by a series of bolts 65, 66 extending respectively through the front and rear motor frames 67, 68. One shaft end 69 carries the eccentric 33 which, as seen in FIGURE 5, is formed of a collar 72 which carries off center portion 73 about which is journaled the loop 31 of nylon plunger 30. A second collar 74 is positioned on the shaft end 69 adjoining collar 72 with both collars 72 and 74 secured to the shaft end by a pair of set screws 76. Rotation of eccentric 33 effects reciprocating motion of plunger 30.

The shaft end 78 has a squirrel-cage blower wheel 80 mounted thereon. The blower wheel 80 has its suction side in close proximity to the air inlet opening 42. The blower establishes an air flow through the housing 10 and heating unit 37 to the discharge opening 43, as indicated by the arrows A.

The switch 82 actuated by trigger 83 is in series with the motor 64 while the heating unit 37 is connected across the line so that after a short warm-up period the thermostat 57 cycles to maintain a substantially constant temperature in the heating zone.

In operation, the line plug at the end of the electric supply cord 85 is connected which initiates the preheating of the heating zone 35 by heating element 53. Following the preheating of the heating zone the actuation of switch 82 by trigger 83 actuates the motor 64. Reciprocation of plunger 30 by the eccentric 33 delivers a supply of liquid insecticide from the reservoir 14 to nozzle 28 from which the liquid issues as an expanding spray of atomized particles. Simultaneously the blower wheel mounted on a common shaft with eccentric 33 induces a flow of air through the interior of the housing 10 and heating zone 35 of tubular heating unit 37 to the outlet 43 thereof. The air follows a path indicated by the arrows A over the irregular surfaces of the housing interior providing cooling for the motor and establishing a turbulent flow. The air flow admixes with the sprayed liquid particles beginning in the frusto-conical initial portion of the heating zone 35. In addition to the air flow established by the blower wheel 80 an additional thrust is provided to the insecticide air mixture in the cylindrical portion of the heating zone 35 as the addition of heat and vaporization of liquid cause an increase in volume and consequently in the velocity of the air-borne insecticide issuing from discharge opening 43.

Since the pump and blower are simultaneously driven by a common motor which attains operating speed almost instantly upon actuation causing virtually immediate delivery of both insecticide and air at operating conditions a constant predetermined balance between the quantities of air and insecticide is established and maintained avoiding the necessary of operator adjustment.

Although but one embodiment has been shown and described, it will be apparent to those skilled in the art that various changes and modifications may be made therein without departing from the spirit of the invention or from the scope of the appended claims.

What is claimed is:

1. A portable insecticide vaporizer, comprising in combination:
    (a) a housing having an internal cavity and aligned opposed openings therefrom defining thereby a passageway axially through the housing, and a fluid reservoir connected to the housing between the opposed housing openings;
    (b) a pump in the fluid reservoir, an outlet nozzle surrounded by one of the housing openings, conduit means between the pump and nozzle, and drive means for the pump extending into the cavity;
    (c) a motor secured to the housing in the cavity and having an output shaft aligned with the housing openings, an eccentric keyed to the shaft at one end thereof adjacent the one housing opening, means connecting the eccentric and pump drive means, and blower means keyed to the shaft at the other end thereof with its suction side adjacent the other housing opening for forcing air through said passageway and out the one housing opening;
    (d) a heat tube releasably received snugly within a recess in the housing and having an inner wall defining a through passage axially aligned with said nozzle and communicating with the one housing opening, a heating element for the heat tube inner wall and including exterior probes that fit within receiving sockets in the housing, and terminal clips in the housing releasably engaging the probes, whereby the spray discharge from the nozzle and the air discharge from the one housing opening admix in the heat tube passage and the heated inner wall vaporizes the mixture for discharge as a fog.

2. A portable insecticide vaporizer according to claim 1 wherein each probe has a detent groove thereon and the respective terminal clip cooperates therewith to releasable engage the probe.

References Cited

UNITED STATES PATENTS

| | | | |
|---|---|---|---|
| 1,835,707 | 12/1931 | Hermann | 239—351 |
| 2,607,743 | 8/1952 | Hession | 43—129 X |
| 2,613,995 | 10/1952 | Reinhold | 239—351 |
| 2,926,455 | 3/1960 | Morris | 43—129 |
| 3,069,092 | 12/1962 | Norvell | 239—133 |
| 3,192,167 | 6/1965 | Ogawa et al. | 43—129 X |
| 3,200,535 | 8/1965 | Hession | 43—129 |
| 3,255,967 | 6/1966 | Kenney | 239—133 |

EVERETT W. KIRBY, Primary Examiner

U.S. Cl. X.R.

239—8, 133, 351

PO-1050
(5/69)

UNITED STATES PATENT OFFICE
CERTIFICATE OF CORRECTION

Patent No. 3,465,409          Dated September 9, 1969

Inventor(s) Floyd E. Winter and Paul L. Heaberlin

It is certified that error appears in the above-identified patent and that said Letters Patent are hereby corrected as shown below:

Claim 2, Column 4, Line 24 "releasable" should be --releasably--

SIGNED AND
SEALED

DEC 23 1969

(SEAL)
Attest:

Edward M. Fletcher, Jr.
Attesting Officer

WILLIAM E. SCHUYLER, JR.
Commissioner of Patents